(12) United States Patent
Yu et al.

(10) Patent No.: US 10,001,988 B2
(45) Date of Patent: Jun. 19, 2018

(54) COMPATIBILITY MODULE TO SUPPORT AN AUTOMOTIVE SYSTEM UPGRADE

(71) Applicant: TOYOTA JIDOSHA KABUSHIKI KAISHA, Toyota-shi, Aichi-ken (JP)

(72) Inventors: Huafeng Yu, Cupertino, CA (US); Bowen Zheng, Riverside, CA (US); Chung-Wei Lin, Sunnyvale, CA (US)

( * ) Notice: Subject to any disclaimer, the term of this patent is extended or adjusted under 35 U.S.C. 154(b) by 156 days.

(21) Appl. No.: 15/047,613

(22) Filed: Feb. 18, 2016

(65) Prior Publication Data

US 2017/0242688 A1    Aug. 24, 2017

(51) Int. Cl.
*G06F 9/44* (2018.01)
*H04L 29/08* (2006.01)
*G06F 9/445* (2018.01)

(52) U.S. Cl.
CPC .............. *G06F 8/658* (2018.02); *G06F 8/68* (2013.01); *G06F 9/4411* (2013.01); *H04L 67/12* (2013.01); *H04L 67/34* (2013.01); *G06F 8/65* (2013.01)

(58) Field of Classification Search
CPC ... G06F 8/68; G06F 8/65; G06F 8/658; G06F 9/4411; H04L 67/12
USPC ......................................................... 717/169
See application file for complete search history.

(56) References Cited

U.S. PATENT DOCUMENTS 9,646,428 B1 *  5/2017  Konrardy ................. G07C 5/08
2015/0220321 A1 *  8/2015  Jung .......................... G06F 8/65
                                                                  717/169

FOREIGN PATENT DOCUMENTS

JP          2008-185520         8/2008

* cited by examiner

*Primary Examiner* — Wei Zhen
*Assistant Examiner* — Mohammed Huda
(74) *Attorney, Agent, or Firm* — Burbage Law, P.C.; Jon-Michael Burbage; Elizabeth Ruzich

(57) ABSTRACT

The disclosure includes a system and method for removing an incompatibility between an adaptive sensor system and an adaptive engine control unit system. The method may include detecting an update to one or more of an adaptive sensor system and an adaptive engine control unit system. The method may include identifying an incompatibility between the adaptive sensor system and the adaptive engine control unit system created by the update. The method may include determining one or more modifications for one or more of the first compatibility module and the second compatibility module. The modifications may be configured to remove the incompatibility. The method may include modifying one or more of the first compatibility module and the second compatibility module so that the incompatibility is removed.

20 Claims, 10 Drawing Sheets

| Compatibility Module 199C | Period Transition | Specification Transformation |
|---|---|---|
| 420 | No (Both Fast) | No (Both New) |
| 430 | Yes (Increase for 212) | Yes (New to Old) |
| 440 | Yes (Decrease for 210) | Yes (Old to New) |

COMPATIBILITY MODULE TO SUPPORT AN AUTOMOTIVE SYSTEM UPGRADE

BACKGROUND

The specification relates to a compatibility module to support an automotive system upgrade. For example, the compatibility module may remove an incompatibility between an adaptive sensor system and an adaptive engine control unit system following an upgrade to one of these systems.

Frequent software and hardware upgrades in automotive systems are becoming necessary. Examples may be found in different contexts: components may have potential security risks; higher precision sensors may be required; and new safety techniques are expected to be integrated. Automotive companies are struggling to keep up with the challenge of upgrading their automotive systems.

Currently, the upgrade of components in automotive systems may lead to dramatic design changes, or even redesign of the system, as multiple components can be affected by the upgrade. The result of this approach is increased costs and time to market.

SUMMARY

An automobile may include many components. Each component may include a compatibility module. The compatibility module may implement system upgrades while preserving the compatibility between upgraded and non-upgraded components.

The compatibility module may lie between hardware and the software running on it.

The compatibility module may identify an upgraded component and categorizes an incompatibility that results from the upgraded component.

The compatibility module may select and apply a compatibility function to bridge the gap between upgraded and non-upgraded components. These compatibility functions are developed to make these components work together in a seamless way. The compatibility functions may be configured to manage changes of execution time, period, encryption algorithm, interface, etc. The compatibility function selected by the compatibility module may correspond to the category of incompatibility. For example, a period adjustment function may apply to an incompatibility among the period for two components.

For example, consider a simple automotive system that includes a sensor and an engine control unit that manages the sensor. Assume that the system is upgraded to replace the sensor with a new sensor, and that the new sensor operates at a faster period (or rate) than the prior sensor. The engine control unit was configured to operate with the previous sensor that operated at the slower period. The engine control unit may include a compatibility module that identifies the incompatibility and modifies the operation of the engine control unit so that it operates at a faster period, thereby correcting the incompatibility. The compatibility module itself stores the period parameter that controls the period of the engine control unit. The compatibly module modifies itself so that it stores the period parameter that results in the faster period and the resulting removal of incompatibility between the sensor and the engine control unit that manages the sensor. Without the compatibility module, the engine control unit would have needed to be replaced with a new engine control unit that was compatible with the new sensor, which would have increased costs and implementation time for the upgrade.

Accordingly, including a compatibility module the upgradable elements of an automotive system is a cost-efficient and flexible solution to the problem of frequent hardware and software upgrades. This approach is cost-efficient, for example, because it can avoid system-level changes caused by a small number of component upgrades. This approach is flexible, for example, because it enables the upgrades in an incremental way, i.e., it does not require all relevant components to be upgraded at the same time.

Example embodiments will now be described.

A system of one or more processors can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a system to remove an incompatibility between an adaptive sensor system and an adaptive engine control unit system, the system including: an automobile including an adaptive sensor system that is communicatively coupled to an adaptive engine control unit system; where the adaptive sensor system includes a first compatibility module that is communicatively coupled to a sensor and a sensor module, where the sensor includes hardware configured to measure an attribute of a physical environment and the sensor module includes instructions that, responsive to being executed by a processor of the automobile, cause the sensor to record sensor data describing a measurement of the physical environment measured by the sensor and provide the sensor data to the adaptive engine control unit system; where the adaptive engine control system includes a second compatibility module that is communicatively coupled to an engine control unit and an engine control unit module, where the engine control unit includes hardware configured to manage a performance of the automobile and the engine control unit module includes instructions that, responsive to being executed by the processor, cause the engine control unit to determine whether to modify performance of the automobile responsive to the sensor data; where the first compatibility module includes a first data structure that stores a first set of sensor performance parameters that control a first operation of the sensor and the sensor module so that modifying a sensor performance parameter included in the first set modifies the first operation of one or more of the sensor and the sensor module; where the second compatibility module includes a second data structure that stores a second set of engine control unit performance parameters that control a second operation of the engine control unit and the engine control unit module so that modifying an engine control unit parameter included in the second set modifies the second operation of one or more of the engine control unit and the engine control unit module; and where one or more of the first compatibility module and the second compatibility module further include a supervisor module that includes instructions that, when executed by the processor, cause the processor to perform steps including: detecting an update to one or more of the sensor, the sensor module, the engine control unit and the engine control unit module; identifying an incompatibility between the adaptive sensor system and the adaptive engine control unit system created by the update;

determining one or more modifications for one or more of the first set included in the first compatibility module and the second set included in the second compatibility module, where the modifications are configured to remove the incompatibility; and modifying one or more of the first set included in the first compatibility module and the second set included in the second compatibility module, where the modification removes the incompatibility. Other embodiments of this aspect include corresponding computer systems, apparatus, and computer programs recorded on one or more computer storage devices, each configured to perform the actions of the methods.

Implementations may include one or more of the following features. The system where the incompatibility is a scheduling incompatibility between the adaptive sensor system and the adaptive engine control unit and the determined modifications include adjusting a scheduling parameter for one or more of the sensor, the sensor module, the engine control unit and the engine control unit module to remove the incompatibility. The system where the incompatibility is a period incompatibility between the adaptive sensor system and the adaptive engine control unit and the determined modifications include adjusting a period parameter for one or more of the sensor, the sensor module, the engine control unit and the engine control unit module to remove the incompatibility. The system where the incompatibility is a specification incompatibility between the adaptive sensor system and the adaptive engine control unit and the determined modifications include adjusting using a prior specification for one or more of the sensor and the engine control unit to remove the incompatibility. The system where the update includes uninstalling the sensor and replacing the sensor with a new sensor. The system where the update includes uninstalling the sensor module and replacing the sensor module with a new sensor module. The system where the update includes uninstalling the engine control unit and replacing the engine control unit with a new engine control unit. The system where the update includes uninstalling the engine control unit module and replacing the engine control module with a new engine control unit module. The system where the processor is an element of the engine control unit.

One general aspect includes a method to remove an incompatibility between an adaptive sensor system and an adaptive engine control unit system included in an automobile, where the adaptive sensor system includes a first compatibility module that is communicatively coupled to a sensor and a sensor module and the adaptive engine control system includes a second compatibility module that is communicatively coupled to an engine control unit and an engine control unit module, the method including: detecting an update to one or more of the sensor, the sensor module, the engine control unit and the engine control unit module; identifying an incompatibility between the adaptive sensor system and the adaptive engine control unit system created by the update; determining, by a processor, one or more modifications for one or more of a first set stored in a first data structure of the first compatibility module and a second set stored in a second data structure of the second compatibility module, where the modifications are configured to remove the incompatibility and the first set includes one or more sensor performance parameters that control a first operation of the sensor and the sensor module so that modifying a sensor performance parameter included in the first set modifies the first operation of one or more of the sensor and the sensor module and the second set includes one or more engine control unit performance parameters that control a second operation of the engine control unit and the engine control unit module so that modifying an engine control unit parameter included in the second set modifies the second operation of one or more of the engine control unit and the engine control unit module; and modifying one or more of the first set included in the first compatibility module and the second set included in the second compatibility module, where the modification removes the incompatibility. Other embodiments of this aspect include corresponding computer systems, apparatus, and computer programs recorded on one or more computer storage devices, each configured to perform the actions of the methods.

Implementations may include one or more of the following features. The method where the incompatibility is a scheduling incompatibility between the adaptive sensor system and the adaptive engine control unit and the determined modifications include adjusting a scheduling parameter for one or more of the sensor, the sensor module, the engine control unit and the engine control unit module to remove the incompatibility. The method where the incompatibility is a period incompatibility between the adaptive sensor system and the adaptive engine control unit and the determined modifications include adjusting a period parameter for one or more of the sensor, the sensor module, the engine control unit and the engine control unit module to remove the incompatibility. The method where the incompatibility is a specification incompatibility between the adaptive sensor system and the adaptive engine control unit and the determined modifications include adjusting using a prior specification for one or more of the sensor and the engine control unit to remove the incompatibility. The method where the update includes uninstalling the sensor and replacing the sensor with a new sensor. The method where the update includes uninstalling the sensor module and replacing the sensor module with a new sensor module. The method where the update includes uninstalling the engine control unit and replacing the engine control unit with a new engine control unit. The method where the update includes uninstalling the engine control unit module and replacing the engine control module with a new engine control unit module. The method where the processor is an element of the engine control unit. The method where the automobile is an autonomous vehicle. Implementations of the described techniques may include hardware, a method or process, or computer software on a computer-accessible medium.

One general aspect includes a non-transitory memory including computer code which, when executed by a processor, causes the processor to perform steps including: detecting an update to one or more of an adaptive sensor system and an adaptive engine control unit system, where the adaptive sensor system includes a first compatibility module that is communicatively coupled to a sensor and a sensor module and the adaptive engine control system includes a second compatibility module that is communicatively coupled to an engine control unit and an engine control unit module; identifying an incompatibility between the adaptive sensor system and the adaptive engine control unit system created by the update; determining one or more modifications for one or more of a first set stored in a first data structure of the first compatibility module and a second set stored in a second data structure of the second compatibility module, where the modifications are configured to remove the incompatibility and the first set includes one or more sensor performance parameters that control a first operation of the sensor and the sensor module so that modifying a sensor performance parameter included in the first set modifies the first operation of one or more of the sensor and the sensor module and the second set includes one or more engine control unit performance parameters that control a second operation of the engine control unit and the engine control unit module so that modifying an engine control unit parameter included in the second set modifies the second operation of one or more of the engine control unit and the engine control unit module; and modifying one or more of the first set included in the first compatibility module and the second set included in the second compatibility module, where the modification removes the incompatibility. Other embodiments of this aspect include corresponding computer systems, apparatus, and computer programs recorded on one or more computer storage devices, each configured to perform the actions of the methods.

BRIEF DESCRIPTION OF THE DRAWINGS

The disclosure is illustrated by way of example, and not by way of limitation in the figures of the accompanying drawings in which like reference numerals are used to refer to similar elements.

FIG. 4C is a table that describes modifications for a compatibility module that will correct a set of incompatibilities resulting from the upgrades described in FIGS. 4A and 4B.

DETAILED DESCRIPTION

Future automotive systems may require cost-effective and flexible upgrades for hardware and software components. The reason is that the replacement cycle of an automobile is typically long, but the technology is evolving at a faster pace. For example, hackers may find software or hardware flaws in a short period, so an upgrade is needed immediately for safety concern instead of waiting to buy a new car. In another example, a much higher resolution sensor may become available on the market with a much lower price, so people are willing to replace the old sensor instead of buying a new vehicle. However, upgrading components in current automotive system is not efficient, and sometimes even leads to redesign of the system. This is due to (1) incompatibility among the upgraded components and the rest of the automotive system and (2) the increasing design complexity of automotive systems, i.e., the upgraded components are likely to be more complex than the prior components they replaced.

Incompatibility among automotive components may be placed in two categories. The first category is a timing property change, such as execution time change and period change.

A change of execution time may result from both software and hardware upgrades. For example, a software upgrade may add new functions in the software that modify the execution time of the hardware operated by the software; or a hardware upgrade may include replacing an existing engine control unit ("ECU") with an accelerated ECU.

A change of period may result from both software and hardware upgrades. For example, a software upgrade for a sensor may increase the period for the sensor operated by the software so that the sampling rate for the sensor is enhanced; or a hardware upgrade may include installed a new sensor that is more accurate because it has a shorter period, and a resulting higher sampling rate.

Changes in a timing property may lead to catastrophic timing failures if they are not handled carefully.

The second category is a software-related specification change. For example, the specification for a piece of software may be upgraded to modify an encryption algorithm or change of a message format. Such changes may result in incompatibility among components of the automobile. This incompatibility may be the result of an inconsistency between the upgraded component and the original component. For example, the software for a sensor may be upgraded so that the sensor uses more bits when recording sensor data, thus making the other components unable to read the sensor data.

Figure 1A:
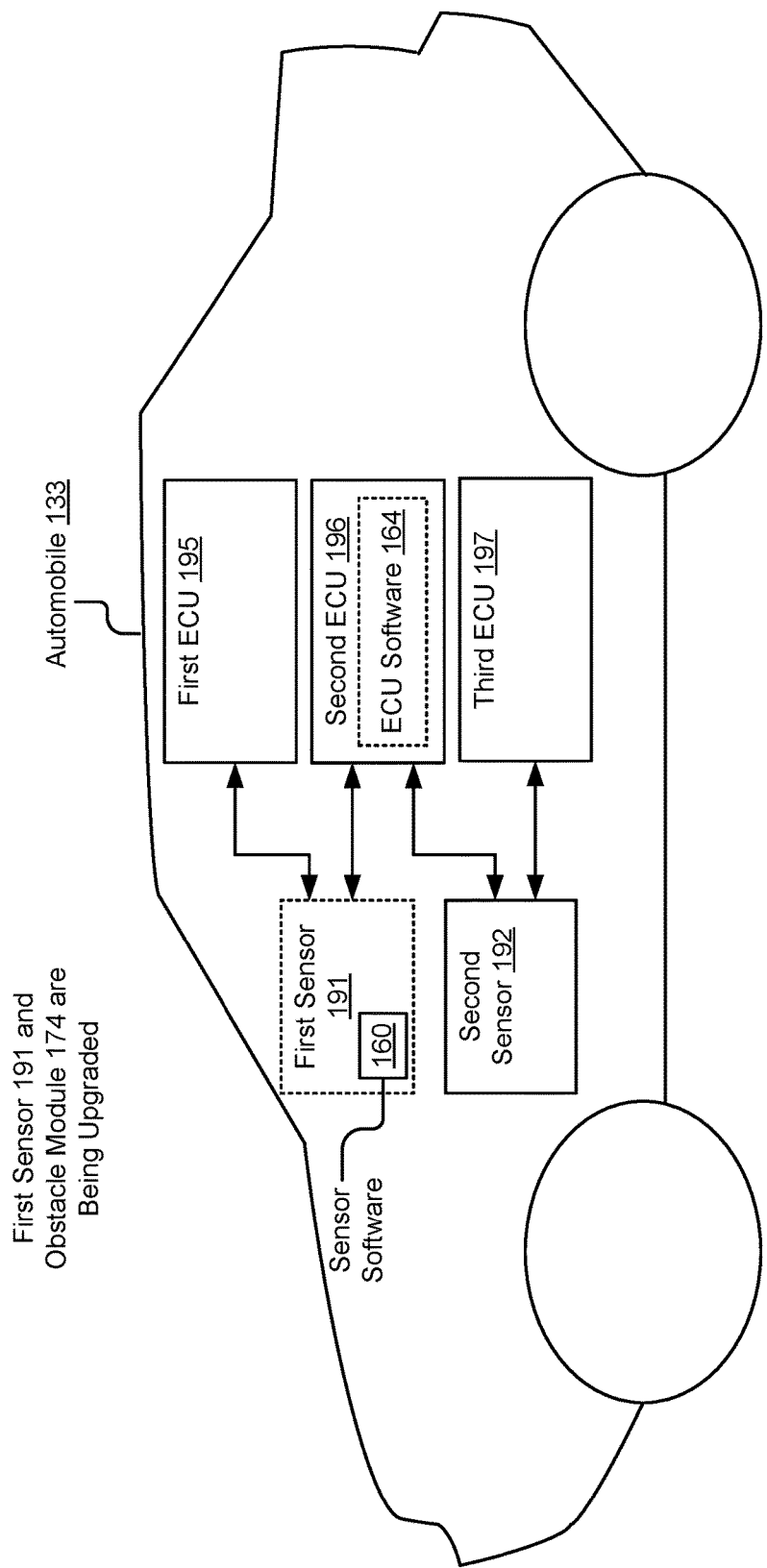
FIG. 1A is a block diagram illustrating a prior art system.

FIG. 1A is a block diagram illustrating an example prior art automobile 133. The depicted components of the automobile 133 form an environment perception system that include one or more of the following conventional elements: a first sensor 191; a first ECU 195; a second sensor 192; a second ECU 196; a third ECU 197. The first sensor 191 may be communicatively coupled to the first ECU 195 and the second ECU 196. The second sensor 192 may be communicatively coupled to the second ECU 196 and the third ECU 197. The first sensor 191 may include sensor software 160. The sensor software 160 may include code and routines configured to enable the first sensor 191 to provide its functionality. The second ECU 196 may include ECU software 164. The ECU software 164 may include code and routines configured to enable the ECU to provide its functionality in operation with the first sensor 191 and the second sensor 192.

Assume that a user wants to upgrade the first sensor 191 for better obstacle detection, so they replace the first sensor 191 with a higher resolution sensor (not pictured) having a shorter period. Further assume that this modification also requires the ECU software 164 to be updated to include a new obstacle detection algorithm so that the second ECU 196 is compatible with the new sensor. As the first sensor 191 and the ECU software 164 are communicatively coupled with other components such as the second sensor 192 and the first ECU 195, these other components may also need to be upgraded to accommodate this one sensor upgrade. For example, the new sensor will have a shorter period, the first ECU 195 will receive more sensor data from the new sensor than before, so some adjustment must be done for the first ECU 195 or the software that is running on the first ECU 195 (not pictured). The same problem will happen to the second sensor 192 it is connected the second ECU 196 which has upgraded software to accommodate the new sensor. Moreover, if the second sensor 192 makes some changes for the incompatibility issue, then the third ECU 197 may no longer be compatible with the second sensor 192, which would mean that the third ECU 197 would also need to be updated. In the end, all the components in the adaptive environment perception system 100 need to be changed. Therefore, a slight change in components of the environment perception system may result in larger changes throughout the entire environment perception system.

Figure 1B:
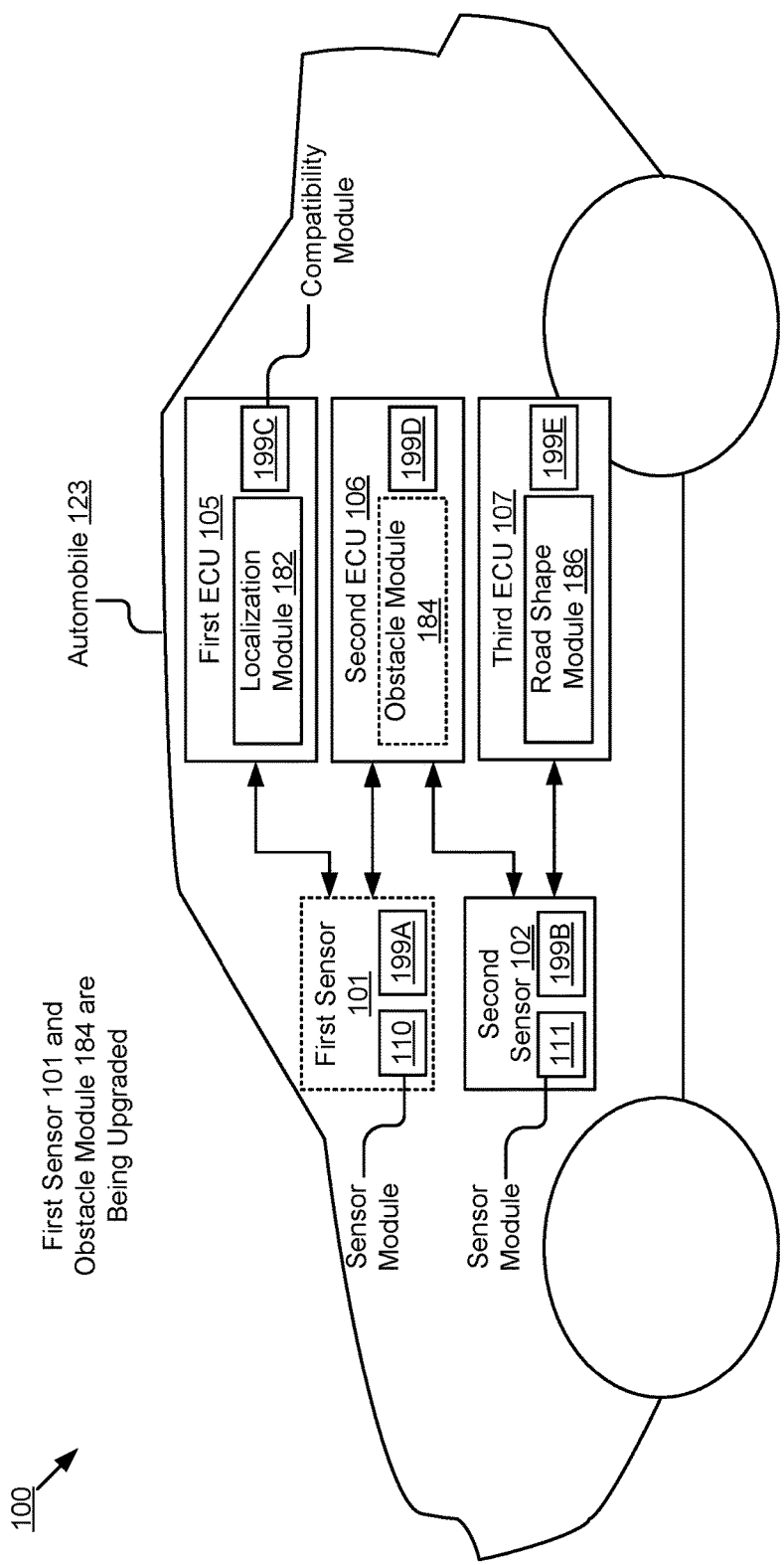
FIG. 1B is a block diagram illustrating an operating environment for an adaptive environment perception system.

FIG. 1B is a block diagram illustrating a system 100 for implementing an adaptive environment perception system 100 (herein "the system 100"). The adaptive environment perception system 100 may be an element of an automobile 123.

FIG. 1B depicts an example use case of a set of automobile components 101, 102, 105, 106, 107 that are configured so that they each include a compatibility module 199, thereby enabling the system 100 to be adaptive as will be described in more detail below. In the example use case depicted in FIG. 1B, the first sensor 101 and the obstacle module 184 of the second ECU 106 may be replaced by new components as part of an upgrade. Each component 102, 105, 106, 107 of the system 100 includes its own compatibility module 199 (including the new sensor that replaces the first sensor 101). The compatibility module 199 may identify the presence of an incompatibility among the automobile components 102, 111, 105, 182, 106, 107, 186 of the system 100 (including the new sensor and its first sensor module, as well as the new obstacle module) and take steps to remove the incompatibility without the need to replace additional components besides the first sensor 101 and the obstacle module 184. The compatibility module 199 is described in more detail below.

The system 100 may include one or more of the following automobile components: a first sensor 101; a second sensor 102; a first ECU 105; a second ECU 106; a third ECU 107. Each of these components is configured to include a compatibility module 199A, 199B, 199C, 199D, 199E and operate in accordance with the functionality of the compatibility module 199A, 199B, 199C, 199D, 199E. Accordingly, the first sensor 101 may not be a conventional sensor since it is modified to include a first compatibility module 199A and operate in accordance with the functionality of the first compatibility module 199A. Similarly, the second sensor 102, the first ECU 105, the second ECU 106 and the third ECU 107 may also not be conventional automobile components since they are each designed and configured to include a compatibility module 199B, 199C, 199D, 199E and operate in accordance with the functionality of the compatibility module 199B, 199C, 199D, 199.

The first sensor 101 may be communicatively coupled to the first ECU 105 and the second ECU 106. The second sensor 102 may be communicatively coupled to the second ECU 106 and the third ECU 107.

The first sensor 101 may include a first compatibility module 199A that is communicatively coupled to the first sensor 101 and a first sensor module 110.

The first sensor 101 may include hardware configured to measure an attribute of a physical environment. For example, the first sensor is a camera that captures an image of the physical environment proximate to the automobile 123.

The first sensor module 110 may include code and routines that, responsive to being executed by a processor of the automobile, causes the first sensor 101 to record sensor data describing a measurement of the physical environment measured by the first sensor 101 and provide the sensor data to the first ECU 105 or the second ECU 106. The processor may be an element of the first sensor 101, the first ECU 105, the second ECU 106 or some onboard vehicle computer included in the automobile 123.

The second sensor 102 may include a second compatibility module 199B that is communicatively coupled to the second sensor 102 and a second sensor module 111.

The second sensor 102 and the second sensor module 111 include functionality similar to the first sensor 101 and the first sensor module 110, respectively, and so, those descriptions will not be repeated here.

The second sensor 102 may be a sensor or combination of sensors configured to provide sensor data from which obstacles on a roadway may be detected or the shape of a roadway may be determined. For example, the second sensor 102 may be a LIDAR camera or some other automobile sensor that provides the sensor data necessary for the second ECU 106 or the third ECU 107 to provide its functionality.

The first ECU 105 may include a third compatibility module 199C that is communicatively coupled to the first ECU 105 and a localization module 182.

The first ECU 105 may include a processor-based computer device that is configured to manage the performance or operation of the automobile 123 based at least in part on the sensor data it receives.

For example, the first ECU 105 may include hardware and communicative couplings necessary to control a set of actuators on an engine of the automobile 123 to ensure optimal or substantially optimal performance of the engine. The first ECU 105 may receive sensor data from one or more sensors (such as the first sensor 101), interpret the sensor data using one or more multidimensional performance maps or lookup tables and then adjust the engine actuators accordingly to achieve optimal or substantially optimal performance of the engine.

The first ECU 105 may cooperate with one or more other ECUs to control performance of the engine of the automobile 123. For example, the first ECU 105 may cooperate with the second ECU 106 and the third ECU 107 to control performance of the engine of the automobile 123.

In some embodiments, the automobile 123 may include a plurality of engines that are controlled by one or more of the ECUs 105, 106, 107.

The first ECU 105 may include an engine control unit module (not pictured). The engine control unit module may include instructions that, responsive to being executed by a processor, cause the first ECU 105 to determine whether to modify performance of the automobile responsive to the sensor data. The processor may be an element of the first ECU 105. The first ECU 105 may also include a non-transitory memory.

As depicted in FIG. 1B, the first ECU 105 includes a localization module 182. The localization module 182 may include code and routines that, responsive to being executed by a processor, cause the processor to provide localization of the sensor data received from the first sensor 101. For example, the sensor data may be analyzed to determine which portions of the sensor data are relevant to the current location of the automobile 123.

The second ECU 106 may include a fourth compatibility module 199D that is communicatively coupled to the second ECU 106 and an obstacle module 184. The third ECU 107 may include a fifth compatibility module 199E that is communicatively coupled to the third ECU 107 and a road shape module 186. The second ECU 106 and the third ECU 107 include functionality similar to the first ECU 105, and so, those descriptions will not be repeated here.

The obstacle module 184 may include code and routines that, responsive to being executed by a processor, cause the second ECU 106 to analyze sensor data received from the first sensor 101 and the second sensor 102 and identify one or more obstacles in the physical environment of the automobile 123.

The road shape module 186 may include code and routines that, responsive to being executed by a processor, cause the third ECU 107 to analyze sensor data received from the second sensor 102 and identify the shape of a road in the physical environment of the automobile 123.

In FIG. 1B, assume that the first sensor 101 and the obstacle module 184 may need to be updated. For example, the first sensor 101 may need to be replaced with new hardware (i.e., a different sensor) and the obstacle module 184 may need to be replaced with new code and routines (or a modification to the existing code and routines, i.e., a patch). As explained with reference to FIG. 1A, such an update may ordinarily result and numerous incompatibilities among the elements of the system. Removing all the incompatibilities present in the system 100 may require every element of the system 100 to be replaced. However, in FIG. 1B each element of the system 100 includes a compatibility module 199A, 199B, 199C, 199D, 199E (referred to individually or collectively as "compatibility module 199"), and so, this may not be necessary.

In some embodiments, the compatibility module 199 may be configured so that the compatibility module 199 itself may be modified to remove any incompatibilities present in the system 100 instead of needing to replace additional components in order to remove all incompatibilities present in the system.

In some embodiments, the compatibility module 199 may include a combination of hardware (e.g., a non-transitory data structure) and code and routines (e.g., a supervisor module, as well as other modules in some embodiments).

In some embodiments, the compatibility module 199 includes a non-transitory data structure that stores a set of performance parameters that control the operation of the hardware (e.g., first sensor 101) and the code and routines (e.g., first sensor module 110) with which it is associated. The parameters and the storage of the parameters in the data structure may be configured so that modifying a performance parameter included in the set modifies the operation of the hardware or the code and routines. The non-transitory data structure may include the memory 227 described below with reference to FIG. 2B.

Figure 2A:
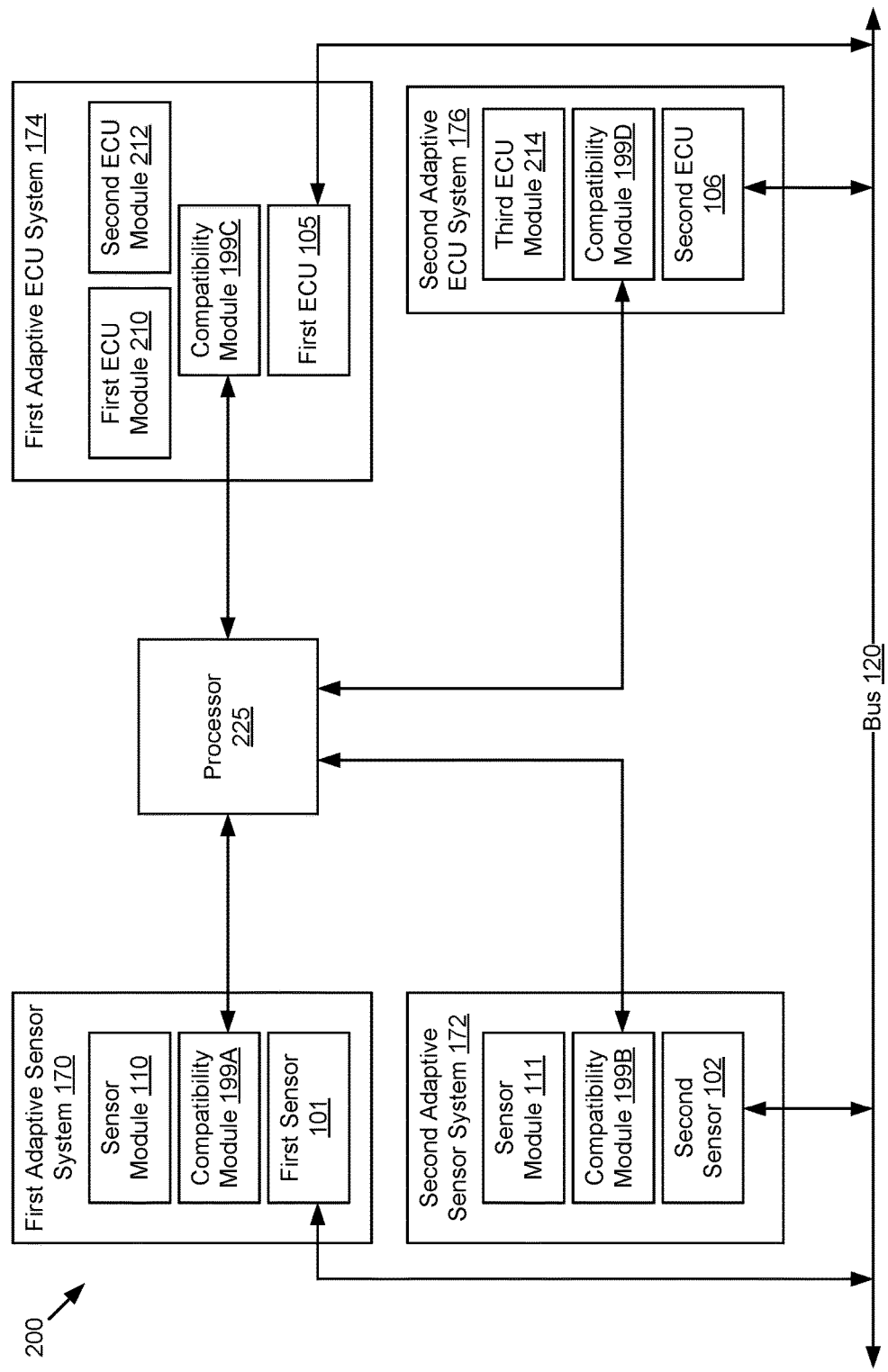
FIG. 2A is a block diagram illustrating an example system for implementing a set of adaptive systems of an automobile.
Figure 2B:
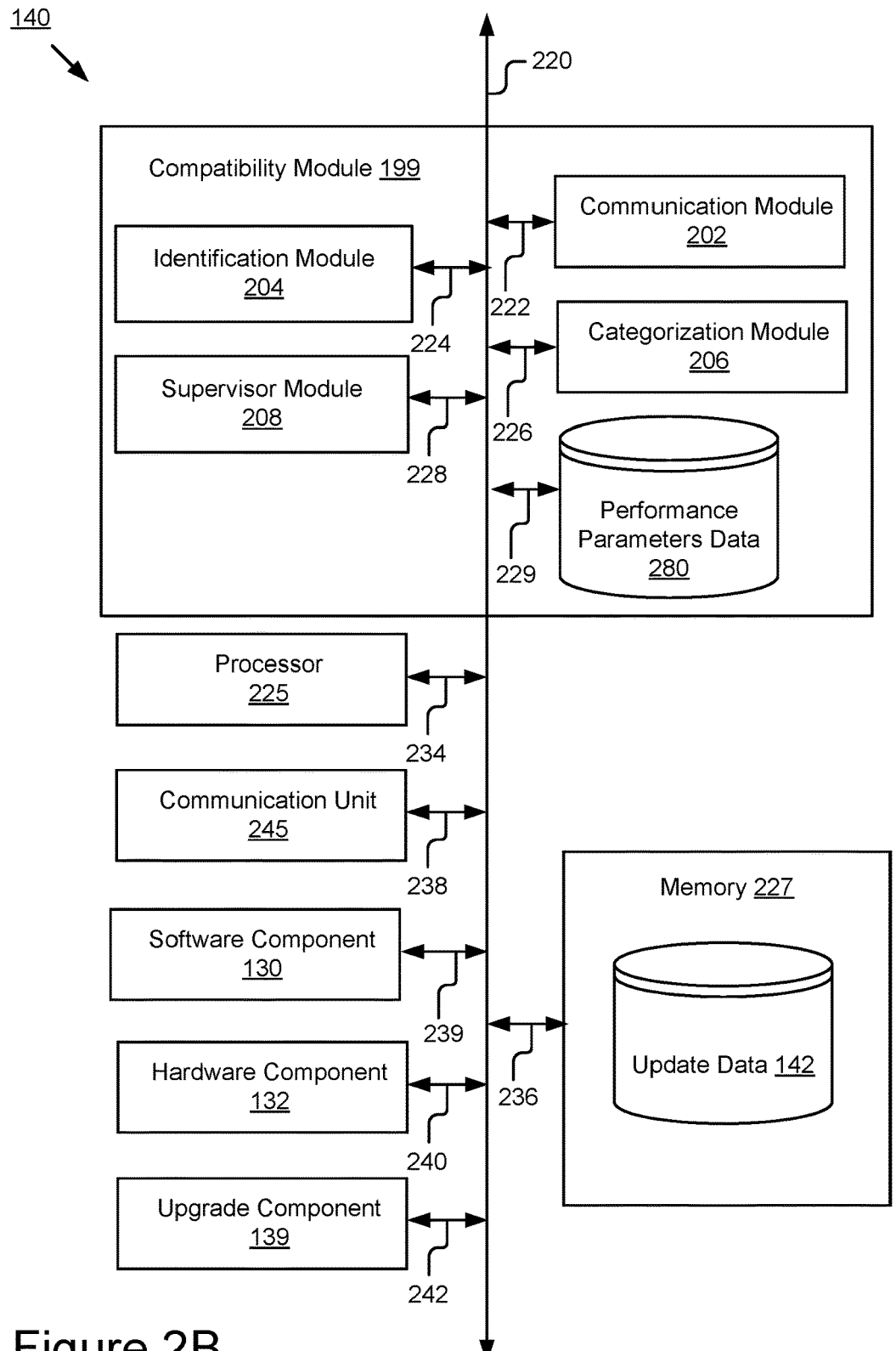
FIG. 2B is a block diagram illustrating an example embodiment of an adaptive system of an automobile.

In some embodiments, the compatibility module 199 includes a supervisor module (see, e.g., element 208 of FIG. 2B). The supervisor module may include code and routines that, when executed by the processor, cause the processor to perform one or more of the following steps: detecting an update to one or more of the elements of the system 100 that results in a timing property change; identifying an incompatibility created by the update; determining one or more modifications for one or more of the performance parameters, where the modifications are configured to remove the incompatibility; and modifying the compatibility module so that its data structure stores one or more new performance parameters that are configured to remove the incompatibility.

Detecting an update to one or more of the elements of the system 100 may include identifying the presence of a new element in the system 100. For example, if a new sensor is installed in the system 100 to replace the first sensor 101, the third compatibility module 199C may call for the first sensor 101 and receive a response for the new sensor, thereby enabling the third compatibility module 199C to identify the presence of the new sensor installed in the system 100.

In some embodiments, the compatibility module 199 may store an identification data structure that includes a list of each element of the system 100 and a unique identifier for each element in the system 100. If a new element is added, the identification data structure may be updated accordingly. This identification data structure may also be used to identify the presence of new elements in the system 100. This identification data structure may also list one or more of the performance parameters for element of the system 100. This identification data structure may also describe a change in a performance parameter when an element of the system 100 is replaced with a new element. FIG. 4B or 4C may include a table that is an example of the identification data structure or a portion of such a data structure.

Identifying an incompatibility created by the update may include analyzing output signals from a new element added to the system 100 and determining that the output signals indicate a timing property change or a software-related specification change that results in an incompatibility between the new element and one or more of the other elements of the system 100. For example, the new sensor is a higher resolution sensor having a shorter period (i.e., a higher or faster period rate) than the period of the first sensor 101 which it replaced. This will result in more sensor data being received by the first ECU 105, thereby creating an incompatibility between the first ECU 105 and the new sensor. The third compatibility module 199C may identify this incompatibility.

For example, the third compatibly module 199C may query the first compatibility module 199A to identify the period parameter for the new sensor and identify that the period parameter is incompatible with the current period parameter for the first ECU 105. As will be explained below, the third compatibility module 199C may then update the period parameters for the first ECU 105 so that it is compatible with the new sensor.

Determining one or more modifications for one or more of the performance parameters may include calculating one or more new performance parameters that are configured to remove the identified incompatibility. Each of the compatibility modules 199 may execute this step for each of their associated hardware components responsive to identifying the presence of an incompatibility. The modifications may then be applied to the performance parameters stored in the data structures.

In some embodiments including the identification of a software-related specification change, determining one or more modifications for one or more of the performance parameters may include calculating one or more new performance parameters that are configured to remove the identified incompatibility. Each of the compatibility modules 199 may execute this step for each of their associated hardware components responsive to identifying the presence of an incompatibility.

In some embodiments, the supervisor module may include code and routines that, when executed by the processor, cause the processor to perform one or more of the following steps: detecting an update to one or more of the elements of the system 100 that results in a software-related specification change; identifying an incompatibility created by the update; and modifying the compatibility module so that the hardware (e.g., the first sensor 101 or the first ECU 105) operates using a prior version of the software that cause the hardware to provide its functionality (e.g., the first sensor module 110 or the localization module 182).

The compatibility module 199 is described in more detail below with reference to FIGS. 2A, 2B, 2C, 3A, 3B, 4A, 4B and 4C.

The first sensor 101 or the second sensor 102 may include one or more of the following: a camera; a LIDAR sensor; a laser altimeter; a navigation sensor (e.g., a global positioning system (GPS) sensor); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensors.

Figure 1C:
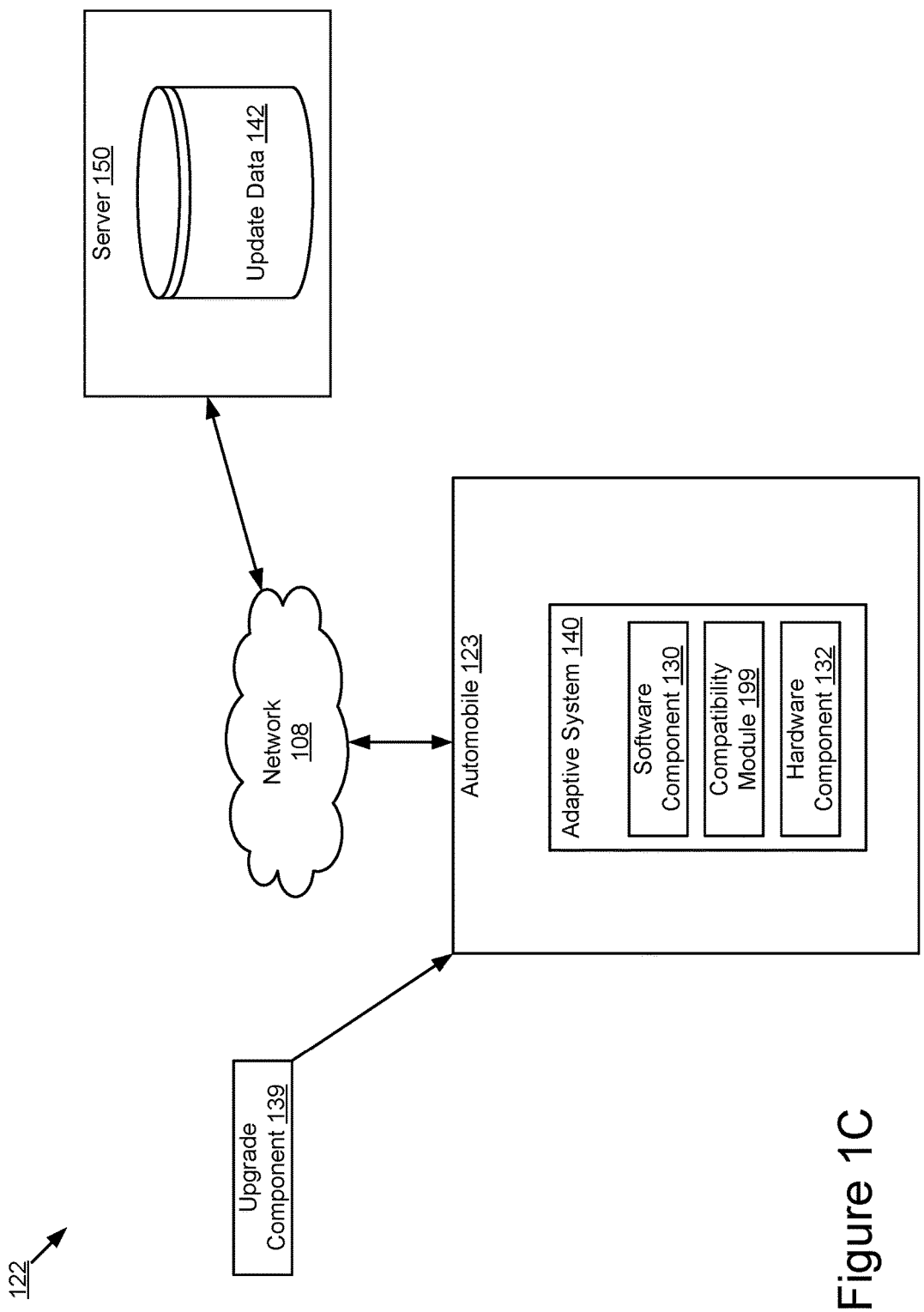
FIG. 1C is a block diagram illustrating an operating environment for implementing an adaptive system.

Referring now to FIG. 1C, depicted is a block diagram illustrating an operating environment 122 for implementing an adaptive system 140.

The operating environment 122 may include an automobile 123 and a server 150. In some implementations, these entities of the operating environment 122 may be communicatively coupled via a network 108 via a wired connection or a wireless connection (e.g., millimeter wave communication, dedicated short range communication (DSRC), wireless fidelity (Wi-Fi), cellular (e.g., 3G, 4G, LTE, etc.), Bluetooth®, etc.) between devices and the network 108 or devices and other devices.

The network 108 may be a conventional type, wired or wireless, and may have numerous different configurations including a star configuration, token ring configuration, or other configurations. Furthermore, the network 108 may include a local area network (LAN), a wide area network (WAN) (e.g., the Internet), or other interconnected data paths across which multiple devices may communicate. In some implementations, the network 108 may be a peer-to-peer network. The network 108 may also be coupled to or may include portions of a telecommunications network for sending data in a variety of different communication protocols. In some implementations, the network 108 includes Bluetooth® communication networks or a cellular communications network for sending and receiving data including via short messaging service (SMS), multimedia messaging service (MMS), hypertext transfer protocol (HTTP), direct data connection, WAP, e-mail, etc. The network 108 may also include functionality or hardware to support cellular communications between entities of the system 100.

The automobile 123 was described above with reference to FIG. 1B, and so, that description will not be repeated here.

The automobile 123 may include and adaptive system 140. An adaptive system 140 may include a component of the automobile 123 that is configured to include the compatibility module 199 and operate in accordance with the functionality of the compatibility module 199. For example, the adaptive system 140 may include a sensor or an ECU that is configured to include the compatibility module 199 and operate in accordance with the functionality of the compatibility module 199. The first sensor 101, second sensor 102, first ECU 105, second ECU 106 and third ECU 107 are examples of adaptive systems 140.

The adaptive system 140 includes a software component 130, a compatibility module 199 and a hardware component 132.

The hardware component 132 includes the hardware that provides the hardware functionality of the adaptive system 140. For example, in FIG. 1B the first sensor 101 may have included camera hardware that provided the hardware functionality of the first sensor 101.

The software component 130 includes the code and routines that provide the software functionality of the adaptive system 140. For example, in FIG. 1B the first sensor module 110 may have included code and routines that provided the software functionality of the first sensor 101.

In some embodiments, the software component 130 includes any software associated with the hardware component 132. For example, the software component 130 may be a security algorithm associated with the hardware component 132 or a messaging protocol associated with the hardware component 132. For example, software component 130 may be a security algorithm that prevents an ECU or sensor from being hacked. In another example, the software component 130 may be a messaging protocol that controls how messages are transmitted among components. Other examples are possible.

The compatibility module 199 was described above with reference to FIG. 1B, and so, that description will not be repeated here.

In some embodiments, the architecture of the adaptive system 140 may be configured so that the compatibility module 199 is a layer between the software component 130 and the hardware component 132.

The upgrade component 139 includes a new component to be installed in the adaptive system 140. The upgrade component 139 may include a hardware component (e.g., a new sensor) or a software component (e.g., a new sensor module). The upgrade component 139 may replace the software component 130 or the hardware component 132.

The server 150 may include a computing device that includes a memory and a processor, for example, a server, a laptop computer, a desktop computer, a tablet computer, a mobile telephone, a PDA, a mobile e-mail device, a portable game player, a portable music player, a television with one or more processors embedded therein or coupled thereto, or other electronic device capable of accessing the network 108.

The server 150 may include a hardware server. The server 150 may include a memory storing server software and a processor for executing the server software.

The server 150 may store update data 142. The update data 142 may be a new software component, or a patch for an existing software component 130, to be installed in the adaptive system 140. In this way, the update data 142 may be a type of upgrade component 139.

The server 150 may provide the upgrade data 142 to the adaptive system 140 via the network 108.

In some implementations, the configuration module 199 may be implemented using hardware including a field-programmable gate array ("FPGA") or an application-specific integrated circuit ("ASIC"). In some other implementations, the configuration module 199 may be implemented using a combination of hardware and software. The configuration module 199 may be stored in a combination of the devices (e.g., servers or other devices), or in one of the devices.

Referring now to FIG. 2A, depicted is a block diagram illustrating an example system 200 for implementing a set of adaptive systems.

The system 200 may include one or more of the following: a first adaptive sensor system 170; a second adaptive sensor system 172; a first adaptive ECU system 174; and a second adaptive ECU system 176. The elements of the system 200 may be communicatively coupled to one another via a bus 120.

The system may include a processor 225. The processor 225 includes an arithmetic logic unit, a microprocessor, a general-purpose controller, or some other processor array to perform computations. In some implementations, the processor 225 may provide electronic display signals to a display device. The processor 225 processes data signals and may include various computing architectures including a complex instruction set computer (CISC) architecture, a reduced instruction set computer (RISC) architecture, or an architecture implementing a combination of instruction sets. The processor 225 may include a graphical processing unit. Although FIG. 2A includes a single processor 225, multiple processors 225 may be included. Other processors, operating systems, sensors, displays, and physical configurations may be possible.

In some embodiments, the processor 225 may be an element of a processor based computing device. The processor-based computing device may include a laptop, tablet computer, personal computer, set-top box, hardware server, ECU, onboard vehicle computer, etc.

The first adaptive sensor system 170 may include one or more of the following: the first sensor module 110; the first compatibility module 199A; and the first sensor 101. These elements of the first adaptive sensor system 170 were described above with reference to FIGS. 1B and 1C, and so, these descriptions will not be repeated here. The first sensor 101 is communicatively coupled to the bus 120. The first compatibility module 199A is communicatively coupled to the processor 225. The first adaptive sensor system 170 may be configured to record sensor data describing the physical environment and provide the sensor data to an ECU.

The second adaptive sensor system 172 may include one or more of the following: the second sensor module 111; the second compatibility module 199B; and the second sensor 102. These elements of the second adaptive sensor system 172 were described above with reference to FIGS. 1B and 1C, and so, these descriptions will not be repeated here. The second sensor 102 is communicatively coupled to the bus 120. The second compatibility module 199B is communicatively coupled to the processor 225. The second adaptive sensor system 172 may be configured to record sensor data describing the physical environment and provide the sensor data to an ECU.

The first adaptive ECU system 174 may include one or more of the following: a first ECU module 210; a second ECU module 212; a third compatibility module 199C; and the first ECU 105. The third compatibility module 199C and the first ECU 105 were described above with reference to FIGS. 1B and 1C, and so, these descriptions will not be repeated here.

The first ECU module 210 may include instructions that, responsive to being executed by the processor 225, cause the first ECU 105 to determine whether to modify performance of the automobile 123 responsive to sensor data received from one or more of the first sensor 101 or the second sensor 102.

The first ECU module 210 may include one or more of the localization module 182, the obstacle module or the road shape module 186 described above with reference to FIG. 1B.

The second ECU module 212 may include code and routines configured to provide functionality similar to the first ECU module 210, and so, that description will not be repeated here.

The first ECU 105 is communicatively coupled to the bus 120. The third compatibility module 199C is communicatively coupled to the processor 225.

The second adaptive ECU system 176 may include one or more of the following: the third ECU module 214; the fourth compatibility module 199C; and the second ECU 106. These elements of the second adaptive ECU system 176 were described above with reference to FIGS. 1B, 1C and 2A, and so, these descriptions will not be repeated here. The second ECU 106 is communicatively coupled to the bus 120. The fourth compatibility module 199D is communicatively coupled to the processor 225.

Each compatibility module 199 may lie between a hardware component and a software component for every device in the system 200. For example, the architecture of the first adaptive sensor system 170 is configured so that the first compatibility module 199A is a layer between the first sensor module 110 and the first sensor 101. When a set of components is upgraded, one or more of the devices may become incompatible with one another due to a timing-related incompatibility or a software-related specification change incompatibility. The compatibility modules 199 for the affected devices can be updated instead of having to replace each component of the system 200.

In some embodiments, the compatibility module 199 may include a designated port that is accessible by the processor 225. The processor 225 may execute the compatibility module 199 via the port to remove one or more incompatibilities in the system 200.

The component upgrade support provided by the compatibility module 199 yields numerous benefits. For example, an upgrade may be implemented while preserving the design architecture of the system 200. In other words, since only the affected compatibility modules 199 need to be updated in some embodiments in order to remove all the incompatibilities in the system, the design architecture of the system 200 remains unchanged from the original design when compared pre-update to post-update.

Referring now to FIG. 2B, depicted is a block diagram illustrating an example embodiment of an adaptive system 140 of an automobile 123. In some implementations, the adaptive system 140 may include an electronic device programmed or configured to perform one or more blocks of the method 300 described below with reference to FIGS. 3A and 3B. In some implementations, the adaptive system 140 may include a special-purpose computing device configured to provide some or all of the functionality described above with reference to the adaptive system 140 or below with reference to method 300 described below with reference to FIGS. 3A and 3B.

The adaptive system 140 may include one or more of the following elements: a compatibility module 199; the processor 225; a memory 227; a communication unit 245; a software component 130; hardware component 132; and an upgrade component 139. The components of the adaptive system 140 are communicatively coupled by a bus 220. In some embodiments, the components of the adaptive system 140 are local to the same hardware so that the bus 220 is not necessary for communication among the components of the adaptive system 140. In some embodiments, communication structures or methods other than the bus 220 may be implemented.

The processor 225 is communicatively coupled to the bus 220 via a signal line 234. The communication unit 245 is communicatively coupled to the bus 220 via a signal line 238. The software component 130 is communicatively coupled to the bus 220 via a signal line 239. The hardware component 132 is communicatively coupled to the bus 220 via a signal line 240. The upgrade component 139 is communicatively coupled to the bus 220 via a signal line 242. The memory 227 is communicatively coupled to the bus 220 via a signal line 236.

The processor 225, the software component 130, the hardware component 132 and the upgrade component 139 were described above with reference to FIGS. 1B, 1C and 2A, and so, these descriptions will not be repeated here.

The memory 227 is a tangible storage medium that stores instructions or data that may be accessed and executed by the processor 225. The instructions or data may include code for performing the techniques described herein. The memory 227 may include a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The memory 227 may include the update data 142. The update data 142 was described above with reference to FIG. 1C, and so, that description will not be repeated here.

In some embodiments, the memory 227 may store one or more prior versions of the software component 130. The prior versions of the software component 130 may be reinstalled by the compatibility module 199 to remove an incompatibility caused by a software-related specification change.

In some embodiments, the memory 227 stores one or more of the following: a communication module 202; an identification module 204; a categorization module 206; a supervisor module 208; a performance parameters data 280.

The communication unit 245 may include hardware that transmits and receives data to and from the network 108. In some implementations, the communication unit 245 includes a port for direct physical connection to the network 108 or to another communication channel. For example, the communication unit 245 includes a USB, SD, CAT-5, or similar port for wired communication with the network 108. In some implementations, the communication unit 245 includes a wireless transceiver for exchanging data with the network 108 or other communication channels using one or more wireless communication methods, including IEEE 802.11, IEEE 802.16, Bluetooth®, or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 108 for distribution of files or media objects using standard network protocols including TCP/IP, HTTP, HTTPS, and SMTP, etc.

In some implementations, the adaptive system 140 includes one or more of the following: the communication module 202; the identification module 204; the categorization module 206; the supervisor module 208; and the performance parameters data 280.

The communication module 202 is communicatively coupled to the bus 220 via signal line 222. The identification module 204 is communicatively coupled to the bus 220 via signal line 224. The categorization module 206 is communicatively coupled to the bus 220 via signal line 226. The supervisor module 208 is communicatively coupled to the bus 220 via signal line 228. The performance parameters data 280 is communicatively coupled to the bus 220 via signal line 229.

The communication module 202 may include code and routines configured to handle communications between one or more of the following elements: the compatibility module 199; the processor 225; the software component 130; the hardware component 132; the upgrade component 139; and the compatibility modules 199 of other adaptive systems 140. In some implementations, the communication module 202 can include a set of instructions executable by the processor 225 to provide the functionality described below for handling communications among the elements listed above. In some implementations, the communication module 202 can be stored in the memory 227 of the adaptive system 140 and can be accessible and executable by the processor 225.

The communication module 202 sends and receives data, via the communication unit 245, to and from the network 108. For example, the communication module 202 receives, via the communication unit 245, the update data 142 from the network 108.

In some embodiments, the communication module 202 receives data from components of the adaptive system 140 and stores the data in the memory 227.

In some embodiments, the communication module 202 modifies the performance parameters data 280 stored on the memory 227.

The identification module 204 may include code and routines configured to identify an incompatibility created by removing one of the software component 130 or the hardware component 132 and installing the upgrade component 139.

The categorization module 206 may include code and routines configured to classify the incompatibility as a timing property change or a software-related specification change.

The supervisor module 208 may include code and routines configured to modify the compatibility module 199 to remove the incompatibility. For example, if the categorization is a software-related specification change, the supervisor module 208 may reinstall a prior version of the software component 130 that removes the incompatibility or modify the performance parameters so that they cause the hardware component 132 to operate based on a prior version of the software component 130 that is stored in the memory 227.

If the categorization is a timing property related change, the supervisor module 208 may determine one or more modifications for one or more of the performance parameters stored in the performance parameters data 280. The modifications may be configured to remove the incompatibility. The supervisor module 208 may modify the performance parameters data 280 so that they store the modifications determined to remove the incompatibility.

Timing property related changes may include two types: a period change and an execution time change.

For a period change the supervisor module 208 may modify a parameter included in the performance parameter data 280 so that incompatibilities among components are eliminated. For example, assume a sensor is replaced with a new sensor that has a higher period. In this example the affected component may be an ECU and the supervisor module 208 included in the compatibility module 199 of the ECU may calculate the increase in period for the new sensor relative to the prior sensor and modify the period parameter for the ECU by an amount that is configured to remove the incompatibility. For example, the period for the ECU may be increased by the same amount or substantially the same amount as the increase in period for the new sensor relative to the prior sensor, or by a minimum amount necessary to make the ECU compatible with the new sensor.

For an execution time change the supervisor module 208 may modify a parameter included in the performance parameter data 280 so that incompatibilities among components are eliminated. For example, assume that an ECU module is replaced with a new ECU module having an increased execution time, thereby creating an incompatibility with a sensor managed by the ECU associated with the ECU module. The identification module 204 of the compatibility module 199 included in the sensor may identify the incompatibility. The performance parameters data 280 for the compatibility module 199 included in the sensor may include a scheduling policy.

In some embodiments the scheduling policy may include, for example, one or more scheduling parameters that indicate when a process starts and one or more execution time parameters that indicates how long each process will run after it starts.

The supervisor module 208 of the compatibility module 199 included in the sensor may calculate the amount of the execution time increase for the new ECU module relative to the prior ECU module and modify an execution time parameter included in the scheduling policy for the sensor by an amount that is configured to remove the incompatibility. For example, the execution time may be may be increased by the same amount or substantially the same amount as the increase in execution time for the new ECU module relative to the prior ECU module, or by a minimum amount necessary to make the sensor compatible with the new ECU module.

The supervisor module 208 may also reorder or delete one or more scheduling parameters to remove incompatibilities.

The performance parameters data 280 may include one or more period parameters for one or more of the software component 130, the hardware component 132, or the upgrade component 139.

The performance parameters data 280 may include one or more scheduling policies for one or more of the software component 130, the hardware component 132, or the upgrade component 139.

The performance parameters data 280 may include one or more execution time parameters for one or more of the software component 130, the hardware component 132, or the upgrade component 139.

The memory 227 may include a plurality of versions of the software component 130, and the performance parameters data 280 may include data that configures which version of the software component 130 controls performance of the hardware component 132 when executed by the processor 225. The memory 227 may also store different encryption algorithms, encryption keys, messaging protocols, etc.

Figure 3A:
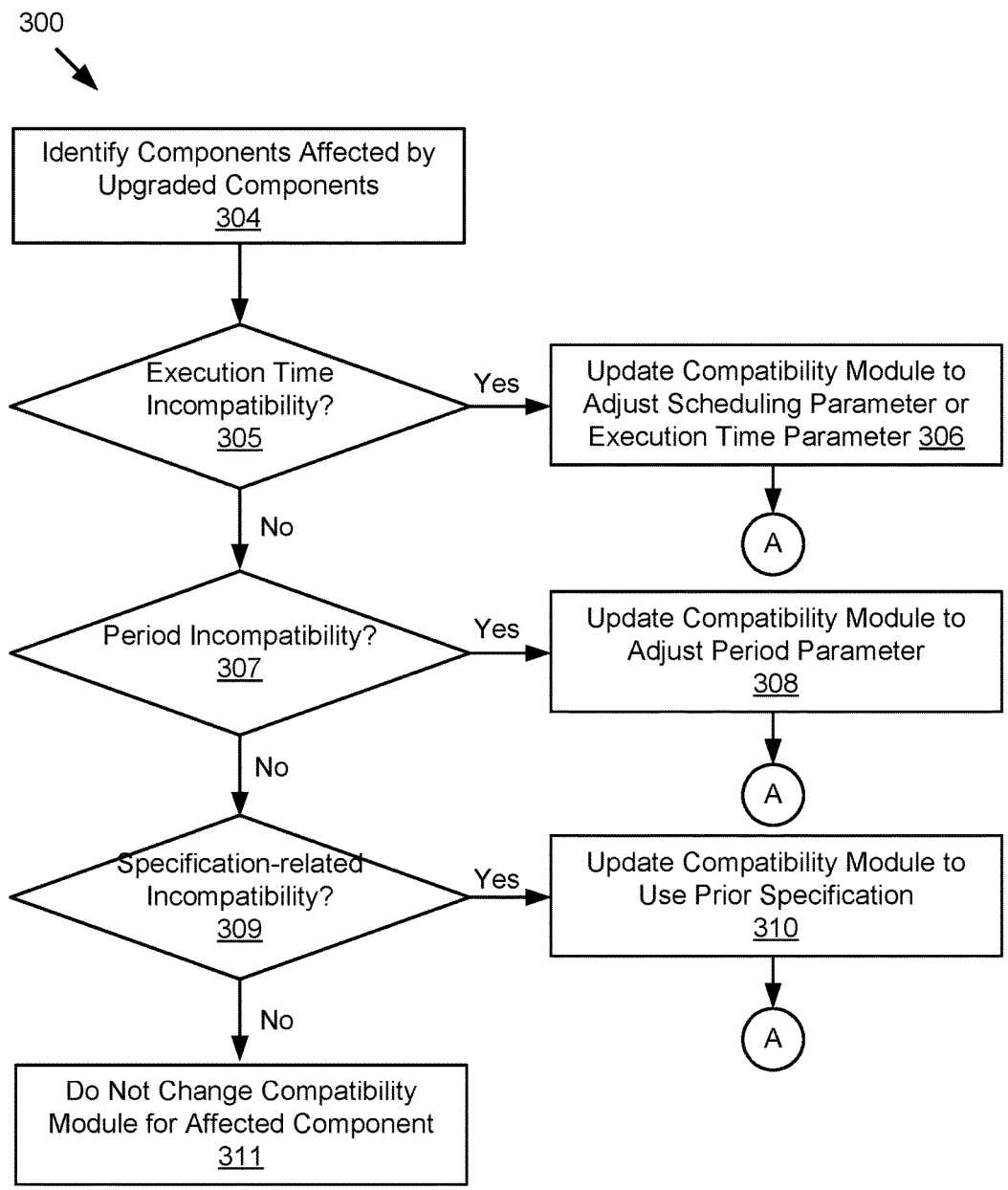
FIGS. 3A and 3B are a block diagram illustrating an example flowchart for a method for upgrading a component of an adaptive system.
Figure 3B:
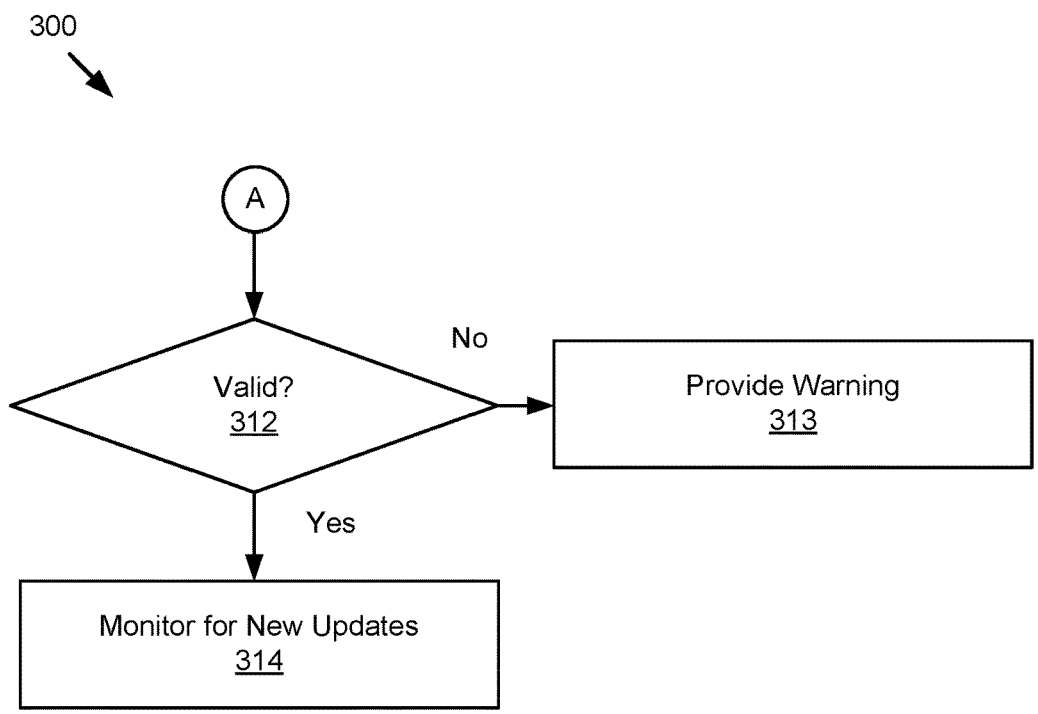

FIGS. 3A and 3B are a block diagram illustrating an example flowchart for a method 300 for upgrading a component of an adaptive system 140.

At step 304, the components affected by the upgraded components are identified. An affected component may include a hardware component or a software component that has an incompatibility with another component because of the upgrade.

A determination 305 is made regarding whether the incompatibility is an execution time incompatibility. If the incompatibility is an execution time incompatibility, the method 300 proceeds to step 306. At step 306 one or more of a scheduling parameter or an execution time parameter may be adjusted. The method 300 proceeds to step 312.

If no execution time incompatibility is determined at step 305, the method 300 proceeds to step 307.

At step 307 a determination is made regarding whether the incompatibility is a period incompatibility. If the incompatibility is a period incompatibility, the method 300 proceeds to step 308. At step 308 a period parameter may be adjusted. The method 300 proceeds to step 312.

If no period incompatibility is determined at step 307, the method 300 proceeds to step 309.

At step 309 a determination is made regarding whether the incompatibility is a specification-related incompatibility. If the incompatibility is a period incompatibility, the method 300 proceeds to step 310. At step 310 the compatibility module may be updated so that the hardware component operates based on the processor executing a prior version of the software module. The method 300 proceeds to step 312.

If no specification-related incompatibility is determined at step 309, the method 300 proceeds to step 311. At step 311 a determination is made that no change will be made to the compatibility module for the affected component.

Referring now to FIG. 3B, at step 312 a determination is made regarding whether modifications to the compatibility module are valid. The modifications are valid if the incompatibilities are removed. If the modifications are not valid, then the method 300 proceeds to step 313 and a warning is provided to the driver of the automobile 123. If the modifications are valid, then the method 300 proceeds to step 314 and the compatibility module monitors for new updates.

Figure 4A:
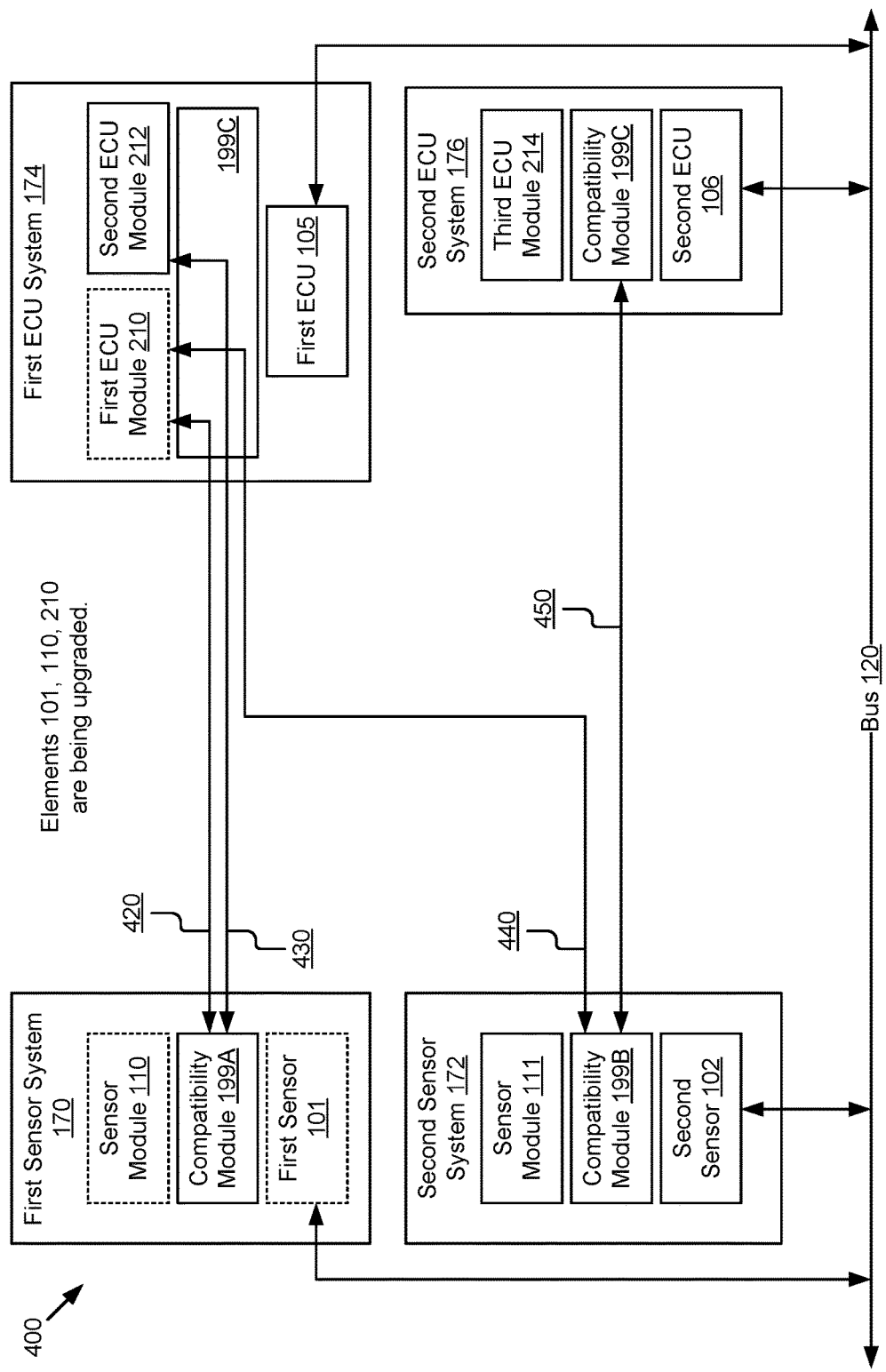
FIG. 4A is a block diagram illustrating an example embodiment of a system in which a set of adaptive systems being upgraded.
Figure 4B:
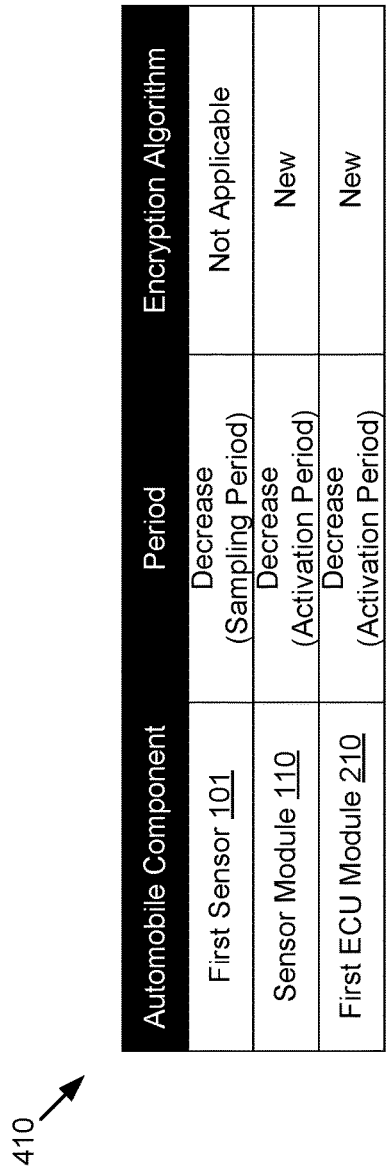
FIG. 4B is a table that describes upgrades for the components of the system in FIG. 4A.

FIG. 4A is a block diagram illustrating an example embodiment of a system 400 in which a set of adaptive systems are being upgraded. The elements included in the system 400 were described above with reference to FIG. 2A, and so, those descriptions will not be repeated here.

The first compatibility module 199A is communicatively coupled to the first ECU module 210 via the signal line 420. The first compatibility module 199A is communicatively coupled to the second ECU module 212 via the signal line 430. The second compatibility module 199B is communicatively coupled to the first ECU module 210 via the signal line 440. The second compatibility module 199B is communicatively coupled to the fourth compatibility module 199C via the signal line 450.

FIG. 4A depicts an example use case in which the first sensor 101, the first sensor module 110 and the first ECU module 210 are being upgraded. The first sensor 101 may be replaced by a new sensor. The first sensor module 110 may be replaced by a new sensor module. The first ECU module 210 may be replaced by a new ECU module.

FIG. 4B is a table 410 that describes upgrades for the components of the system 400 in FIG. 4A. The new sensor has a decreased sampling period relative to the first sensor 101, which means more data can be collected per second. At the same time, the activation period the new sensor module and the new ECU module is decreased to process the increased data. The new sensor module and the new ECU module also use new encryption algorithm to enhance security.

In this case, as the new sensor and the new sensor module are updated together, the first compatibly module 199A will not identify incompatibility between these components. Therefore, only the third compatibility module 199C may be updated as described below with reference to FIG. 4C.

FIG. 4C is a table 415 that describes modifications for the third compatibility module 199C that will correct a set of incompatibilities resulting from the upgrades described in FIGS. 4A and 4B.

The new sensor is faster than the first sensor 101, while the second ECU module 212 is unchanged. As a result, the third compatibility module 199C modifies the performance parameters for the second ECU module 212 to increase the rate transition.

The new ECU module is faster than the first ECU module 210, and so, the third compatibility module 199C modifies the performance parameters for the first ECU module 210 to decrease the rate transition.

Algorithm mismatch also occurs between the new sensor module and the second ECU module 212, as well as the second sensor module 111 and the first ECU module 210. As the new sensor module and the first ECU module 210 both use new encryption algorithm, the third compatibility module 199C layer must use old encryption algorithm for the second ECU module 212 and a new algorithm for the first ECU module 210.

In some embodiments, an engine control unit as described herein may include functionality to provide engine control, body control or transmission control. For example, the engine control unit may control the function of the transmission of the automobile. Similarly, in some embodiments reference to engine control as used herein includes engine control, body control and transmission control. For example, engine control may include control of the functionality of the transmission of the automobile.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some preferred implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A system to remove an incompatibility between an adaptive sensor system and an adaptive engine control unit system, the system comprising:
   an automobile including an adaptive sensor system that is communicatively coupled to an adaptive engine control unit system;
   wherein the adaptive sensor system includes a first compatibility module that is communicatively coupled to a sensor and a sensor module, wherein the sensor includes hardware configured to measure an attribute of a physical environment and the sensor module includes instructions that, responsive to being executed by a processor of the automobile, cause the sensor to record sensor data describing a measurement of the physical environment measured by the sensor and provide the sensor data to the adaptive engine control unit system;
   wherein the adaptive engine control unit system includes a second compatibility module that is communicatively coupled to an engine control unit and an engine control unit module, wherein the engine control unit includes hardware configured to manage a performance of the automobile and the engine control unit module includes instructions that, responsive to being executed by the processor, cause the engine control unit to determine whether to modify performance of the automobile responsive to the sensor data;
   wherein the first compatibility module includes a first data structure that stores a first set of sensor performance parameters that control a first operation of the sensor and the sensor module so that modifying a sensor performance parameter included in the first set of sensor performance parameters modifies the first operation of one or more of the sensor and the sensor module;
   wherein the second compatibility module includes a second data structure that stores a second set of engine control unit performance parameters that control a second operation of the engine control unit and the engine control unit module so that modifying an engine control unit parameter included in the second set modifies the second operation of one or more of the engine control unit and the engine control unit module; and
   wherein one or more of the first compatibility module and the second compatibility module further include a supervisor module that includes instructions that, when executed by the processor, cause the processor to perform steps including:
      detecting an update to one or more of the sensor, the sensor module, the engine control unit and the engine control unit module;
      identifying an incompatibility between the adaptive sensor system and the adaptive engine control unit system created by the update;
      determining one or more modifications for one or more of the first set of sensor performance parameters included in the first compatibility module and the second set of engine control unit performance parameters included in the second compatibility module, wherein the modifications are configured to remove the incompatibility; and
      modifying one or more of the first set of sensor performance parameters included in the first compatibility module and the second set of engine control unit performance parameters included in the second compatibility module.

2. The system of claim 1, wherein the incompatibility is a scheduling incompatibility between the adaptive sensor system and the adaptive engine control unit system and the determined modifications include adjusting a scheduling parameter for one or more of the sensor, the sensor module, the engine control unit and the engine control unit module to remove the incompatibility.

3. The system of claim 1, wherein the incompatibility is a period incompatibility between the adaptive sensor system and the adaptive engine control unit system and the determined modifications include adjusting a period parameter for one or more of the sensor, the sensor module, the engine control unit and the engine control unit module to remove the incompatibility.

4. The system of claim 1, wherein the incompatibility is a specification incompatibility between the adaptive sensor system and the adaptive engine control unit system and the determined modifications include adjusting using a prior specification for one or more of the sensor and the engine control unit to remove the incompatibility.

5. The system of claim 1, wherein the update includes uninstalling the sensor and replacing the sensor with a new sensor.

6. The system of claim 1, wherein the update includes uninstalling the sensor module and replacing the sensor module with a new sensor module.

7. The system of claim 1, wherein the update includes uninstalling the engine control unit and replacing the engine control unit with a new engine control unit.

8. The system of claim 1, wherein the update includes uninstalling the engine control unit module and replacing the engine control unit module with a new engine control unit module.

9. The system of claim 1, wherein the processor is an element of the engine control unit.

10. A method to remove an incompatibility between an adaptive sensor system and an adaptive engine control unit system included in an automobile, wherein the adaptive sensor system includes a first compatibility module that is communicatively coupled to a sensor and a sensor module and the adaptive engine control system includes a second compatibility module that is communicatively coupled to an engine control unit and an engine control unit module, the method comprising:
   detecting an update to one or more of the sensor, the sensor module, the engine control unit and the engine control unit module;
   identifying an incompatibility between the adaptive sensor system and the adaptive engine control unit system created by the update;
   determining, by a processor, one or more modifications for one or more of a first set stored in a first data structure of the first compatibility module and a second set stored in a second data structure of the second compatibility module, wherein the modifications are configured to remove the incompatibility and the first set includes one or more sensor performance parameters that control a first operation of the sensor and the sensor module so that modifying a sensor performance parameter included in the first set modifies the first operation of one or more of the sensor and the sensor module and the second set includes one or more engine control unit performance parameters that control a second operation of the engine control unit and the engine control unit module so that modifying an engine control unit parameter included in the second set modifies the second operation of one or more of the engine control unit and the engine control unit module; and
   modifying one or more of the first set included in the first compatibility module and the second set included in the second compatibility module, wherein the modification removes the incompatibility.

11. The method of claim 10, wherein the incompatibility is a scheduling incompatibility between the adaptive sensor system and the adaptive engine control unit system and the determined modifications include adjusting a scheduling parameter for one or more of the sensor, the sensor module, the engine control unit and the engine control unit module to remove the incompatibility.

12. The method of claim 10, wherein the incompatibility is a period incompatibility between the adaptive sensor system and the adaptive engine control unit system and the determined modifications include adjusting a period parameter for one or more of the sensor, the sensor module, the engine control unit and the engine control unit module to remove the incompatibility.

13. The method of claim 10, wherein the incompatibility is a specification incompatibility between the adaptive sensor system and the adaptive engine control unit system and the determined modifications include adjusting using a prior specification for one or more of the sensor and the engine control unit to remove the incompatibility.

14. The method of claim 10, wherein the update includes uninstalling the sensor and replacing the sensor with a new sensor.

15. The method of claim 10, wherein the update includes uninstalling the sensor module and replacing the sensor module with a new sensor module.

16. The method of claim 10, wherein the update includes uninstalling the engine control unit and replacing the engine control unit with a new engine control unit.

17. The method of claim 10, wherein the update includes uninstalling the engine control unit module and replacing the engine control unit module with a new engine control unit module.

18. The method of claim 10, wherein the processor is an element of the engine control unit.

19. The method of claim 10, wherein the automobile is an autonomous vehicle.

20. A non-transitory memory comprising computer code which, when executed by a processor, causes the processor to perform steps comprising:
   detecting an update to one or more of an adaptive sensor system and an adaptive engine control unit system, wherein the adaptive sensor system includes a first compatibility module that is communicatively coupled to a sensor and a sensor module and the adaptive engine control system includes a second compatibility module that is communicatively coupled to an engine control unit and an engine control unit module;
   identifying an incompatibility between the adaptive sensor system and the adaptive engine control unit system created by the update;
   determining one or more modifications for one or more of a first set stored in a first data structure of the first compatibility module and a second set stored in a second data structure of the second compatibility module, wherein the modifications are configured to remove the incompatibility and the first set includes one or more sensor performance parameters that control a first operation of the sensor and the sensor module so that modifying a sensor performance parameter included in the first set modifies the first operation of one or more of the sensor and the sensor module and the second set includes one or more engine control unit performance parameters that control a second operation of the engine control unit and the engine control unit module so that modifying an engine control unit parameter included in the second set modifies the second operation of one or more of the engine control unit and the engine control unit module; and
   modifying one or more of the first set included in the first compatibility module and the second set included in the second compatibility module, wherein the modification removes the incompatibility.

* * * * *